(12) United States Patent
Canard et al.

(10) Patent No.: US 7,630,927 B2
(45) Date of Patent: Dec. 8, 2009

(54) ANONYMOUS AND SECURE INTERNET PAYMENT METHOD AND MOBILE DEVICES

(75) Inventors: Sébastien Canard, Caen (FR); Eric Malville, Bayeux (FR); Jacques Traore, Saint Georges des Groseillers (FR); Bruno Cosnefroy, Couville (FR); Sidonie Caron, Clamart (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 11/596,778

(22) PCT Filed: May 17, 2005

(86) PCT No.: PCT/FR2005/001228

§ 371 (c)(1),
(2), (4) Date: Oct. 29, 2007

(87) PCT Pub. No.: WO2005/124708

PCT Pub. Date: Dec. 29, 2005

(65) Prior Publication Data

US 2008/0052227 A1   Feb. 28, 2008

(30) Foreign Application Priority Data

May 18, 2004   (FR) .................................. 04 05402

(51) Int. Cl.
*G06Q 40/00*   (2006.01)
(52) U.S. Cl. .............................. 705/35; 705/36; 705/38; 700/99
(58) Field of Classification Search .................. 705/39, 705/35, 36, 38
See application file for complete search history.

(56) References Cited

U.S. PATENT DOCUMENTS 6,636,969 B1   10/2003   Jakobsson et al.

(Continued)

FOREIGN PATENT DOCUMENTS

EP   0 747 867 A   12/1996

(Continued)

OTHER PUBLICATIONS

Digital Payment Systems Enabling Security and Unobservability. Holger Burk, Andreas Pfitzmann. Computers & Security 8/5 (1989) 399-416.*

(Continued)

*Primary Examiner*—Frantzy Poinvil
*Assistant Examiner*—Clifford Madamba
(74) *Attorney, Agent, or Firm*—Cohen, Pontani, Lieberman & Pavane LLP

(57) ABSTRACT

An anonymous and secure on-line payment system and method based on the partially blind signature cryptographic method with revocable anonymity. To this end, an Anonymity Server (SA) enables the Customer (C) to acquire on-line anonymous payment means on the basis of a protocol that does not enable the Anonymity Server to link the payment means to the Customer (C). The Payment Server (SdP) comprises means for opening an anonymous account using the anonymous payment means (50). A Customer (C) can make an on-line purchase from a Merchant Site (SM) without having to give a bank card number and remaining anonymous to the merchant and more generally to any entity present in the transaction or absent therefrom. However, this anonymity may be revoked by a trusted entity in the event of fraud on the Customer. Finally, a Customer can make payments when on the move.

14 Claims, 3 Drawing Sheets

U.S. PATENT DOCUMENTS

| | | | |
|---|---|---|---|
| 6,807,530 B1 * | 10/2004 | Shub et al. | 705/1 |
| 7,203,315 B1 * | 4/2007 | Livesay | 380/255 |
| 2003/0158960 A1 * | 8/2003 | Engberg | 709/237 |

FOREIGN PATENT DOCUMENTS

| | | |
|---|---|---|
| EP | 1 158 471 A | 11/2001 |
| EP | 1 164 777 A | 12/2001 |
| GB | 2 359 652 A | 8/2001 |
| WO | WO 99/56254 A | 11/1999 |
| WO | WO 00/70487 A | 11/2000 |
| WO | WO 00/77747 A | 12/2000 |
| WO | WO00/77748 A | 12/2000 |

OTHER PUBLICATIONS

The State of the Art in Electronic Payment Systems. Asokan et al. IEEE Computer (1997).*

Anonymity Control in E-Cash Systems. Davida et al. Lecture Notes in Computer Science (Financial Cryptography), vol. 1318/1997.*

* cited by examiner

ANONYMOUS AND SECURE INTERNET PAYMENT METHOD AND MOBILE DEVICES

RELATED APPLICATIONS

This is a U.S. National Phase Application under 35 Usc 371 of International Application PCT/FR2005/001228, filed on May 17, 2005.

The general technical field of the present invention is that of the security of services, and more particularly that of electronic commerce, employing cryptography.

More precisely, the invention relates to an advanced application of transaction services: electronic payment.

GENERAL DESCRIPTION OF THE PRIOR ART

The general object of the invention is to propose means enabling a user: 1) to pay on-line without having to give a bank card number, 2) to guarantee anonymity, 3) to revoke that anonymity in the event of fraud, and 4) to be able to pay when on the move.

At present a number of techniques provide a partial response to the above requirements, but there is no complete solution providing a response to the overall problem as stated above.

The major solutions for paying on-line without having to give a bank card number are virtual dynamic cards, prepaid cards, and electronic coins.

Virtual dynamic cards (see the documents [ECBa, ECBb]) are virtual bank cards whose number can be discarded because it is generated on each purchase.

The principle of virtual cards is as follows.

The user connects to the bank's on-line service, selects a password and a user name that are stored on the bank's server, and downloads software enabling the user to obtain virtual card numbers.

Then, for each transaction that the user executes on a Merchant Site, a new 16-digit virtual card number is generated by the bank's on-line service. It is this number that the user communicates to the Merchant Site to pay for a purchase, rather than the number of a physical bank card. On each new purchase by the user, information concerning the purchase is stored in the bank's server.

Those virtual dynamic cards have the following drawbacks:

they do not guarantee the anonymity of the user, in particular vis à vis the user's bank; the bank's on-line service knows the full identity of the user and all of that user's purchases, which are stored in the bank's server;

the profile of the user can be traced and even associated with the user's real identity;

the user cannot employ them to make a payment from a mobile telecommunications terminal.

Prepaid cards (see the documents [TSa, TSb]) are scratch cards credited with a certain amount.

The principle of prepaid cards is as follows.

The user purchases a prepaid card credited with a certain amount at a sales outlet such as a tobacconist, for example. The user then has that sum of money available and can spend it on-line. To this end, on each new on-line purchase, the user supplies to the Merchant Site the code that is uncovered on the prepaid card by scratching off the covering, instead of giving the user's physical bank card number.

Those prepaid cards have the following disadvantages:

payment cannot be effected totally on-line, since the user must purchase the prepaid card in advance at a sales outlet;

the anonymity of the user cannot be revoked, and in the event of fraud it is not possible to discover the identity of the user from the code of the prepaid card.

Electronic coins (see the document [P.K03]) are part of the "Pay Cash" payment system that uses the principle of electronic change proposed by Chaum (see the document [C82]). That payment system is based on the use of blind signatures.

In a system based on the principle of blind signatures, an entity signs the electronic coins of a user "blind", i.e. without knowing the content of the electronic coins. That entity, called the signatory, subsequently, at the time of payment, verifies that the electronic coins are valid.

Thus that solution enables the user to effect a purchase on-line without giving the Merchant Site the number of the user's physical bank card and to remain anonymous vis à vis the Merchant Site and the bank.

Those electronic coins have the following disadvantages:

the anonymity of the user cannot be revoked;

the user cannot use them to make a payment from a mobile telecommunications terminal; with the "Pay Cash" system, all transactions must be signed by the user's terminal, and generating an electronic signature necessitates the use of computation means more powerful than the computation means generally available in mobile telecommunications terminals.

An object of the present invention is to provide a complete anonymous and secure payment solution that overcomes most of the drawbacks cited above.

SUMMARY OF THE INVENTION

The invention provides to an anonymous and secure on-line payment method usable by a Customer from a fixed or mobile telecommunications terminal and characterized in that it comprises the steps of:

an Anonymity Server offering the Customer the on-line acquisition of anonymous means of payment from the telecommunication terminal, said acquisition being based on a protocol that does not enable the Anonymity Server to link the payment means to the Customer;

a Payment Server enabling the Customer to open an anonymous account from the telecommunication terminal using the anonymous payment means acquired in the preceding step; and said Payment Server enabling the Customer to use the anonymous account to effect on-line purchases on Merchant Sites and to manage the anonymous account.

In the context of the present invention, the expression "on-line payment" means any payment effected remotely via a telecommunications service or a network such as the Internet.

The present invention therefore offers a complete and global solution that:

enables the Customer to pay on-line without having to give a bank card number;

guarantees the anonymity of the Customer: the Customer does not have to give any personal data at the time of the purchase; the purchase is anonymous vis àvis the merchant and also vis à vis any entity involved in the transaction (in particular the bank of the Customer); the profile of the Customer therefore cannot be traced;

enables the anonymity of the Customer to be revoked in the event of fraud: the invention is based on revocable anonymity mechanisms enabling a trusted entity (for example a legal entity) to revoke anonymity in the event of fraud or a dispute;

enables the Customer to pay when on the move: the invention enables the Customer to pay from a fixed telecommunications terminal such as a personal computer and also from a cyber café or from a mobile telephone, for example.

Preferred but non-limiting features of the anonymous and secure on-line payment method of the invention include:

The method further comprises the step of a trusted entity revoking the anonymity of the Customer on the basis of information supplied by the Anonymity Server in the event of fraud.

The step of offering the Customer the on-line acquisition of anonymous means of payment comprises the sub-steps of the Anonymity Server:

authenticating the Customer on the basis of personal data sent by the Customer;

debiting a personal account of the Customer for an amount corresponding to an amount required by the Customer for the payment means;

generating the payment means, comprising in particular the amount required by the Customer and a signature of the Anonymity Server; and sending the generated payment means to the Customer.

The step of enabling the opening of an anonymous account using the anonymous payment means acquired by the Customer comprises the sub-steps of the Payment Server:

receiving the payment means and verifying its validity;

creating an anonymous account for the Customer on the basis of the information supplied by the payment means, said account being credited with the required amount; and sending a code to the Customer enabling the Customer to use the created anonymous account to effect an on-line purchase on Merchant Sites.

The step of enabling the use of the anonymous account to effect on-line purchases on Merchant Sites and of managing the account comprises the sub-steps of the Payment Server:

anonymously authenticating the Customer by means of the code supplied by the Payment Server on opening the account;

debiting the anonymous account of the Customer; and redirecting the Customer to the chargeable pages of the Merchant Site or sending the Merchant Site an approval for the payment.

The invention also provides an Anonymity Server adapted to offer a Customer the on-line acquisition of anonymous payment means, the Server being characterized in that said acquisition is based on a protocol that does not enable the Anonymity Server to link the payment means to the Customer and said anonymous payment means include data necessary for a Payment Server to be able to open an anonymous account using the anonymous payment means and manage that account, said anonymous account enabling anonymous on-line purchases on Merchant Sites.

Preferred but non-limiting features of the Anonymity Server include:

the acquisition of the payment means is based on a partially blind signature protocol that does not enable the Anonymity Server to link the payment means to the Customer;

it comprises means adapted to authenticate the Customer on the basis of personal data sent by the Customer;

it comprises means adapted to debit a personal account of the Customer by an amount of money corresponding to an amount required by the Customer for the payment means;

it comprises means adapted to generate the payment means which comprise in particular the amount required by the Customer and a signature of the Anonymity Server, which signature is unknown to the Anonymity Server; and it comprises means adapted to send the generated payment means to the Customer.

The invention further provides a Payment Server characterized in that it includes means adapted to open an anonymous on-line account using anonymous payment means acquired on-line by a Customer from an Anonymity Server, said acquisition being based on a protocol that does not enable the Anonymity Server to link the payment means to the Customer, and further adapted to manage said anonymous account, which is used to effect anonymous on-line purchases on Merchant Sites.

Preferred but non-limiting features of the Payment Server are that it includes:

means adapted to receive payment means and means adapted to verify the validity of the payment means;

means adapted to create the anonymous account for the Customer on the basis of information supplied by the payment means, said account being credited with the amount indicated on the payment means;

means adapted to send a code to the Customer enabling the Customer to use the created anonymous account to effect anonymous on-line purchases on Merchant Sites;

means adapted to authenticate anonymously the Customer wishing to use the anonymous account to effect an on-line purchase;

means adapted to debit the anonymous account of the Customer; and means adapted to redirect the Customer to the chargeable pages of the Merchant Site or means adapted to send the Merchant Site an approval for the payment.

The invention further provides to an anonymous and secure on-line payment system usable by a Customer from a fixed or mobile telecommunication terminal, the system being characterized in that it comprises the following entities:

an Anonymity Server entity offering the Customer the on-line acquisition of anonymous payment means, said acquisition being based on a protocol that does not enable the Anonymity Server to link the payment means to the Customer; and a Payment Server entity adapted to open an anonymous account using the anonymous payment means and to manage that account, said anonymous account enabling anonymous on-line purchases on Merchant Sites.

Preferred but non-limiting features of the Payment Server include:

it further comprises a trusted entity called a trustee and a revocation protocol enabling the trustee to revoke the anonymity of the Customer on the basis of information supplied by the Anonymity Server in the event of fraud;

it uses the method described above.

DESCRIPTION OF THE DRAWINGS

Other features, objects and advantages of the present invention will emerge from the following description, which is purely illustrative and is not limiting on the invention, and must be read with reference to the appended drawings, in which.

DESCRIPTION OF THE INVENTION

An object of the present invention is to provide an anonymous and secure on-line payment method in which the Customer is anonymous vis à vis the Merchant Site but also vis à vis the organization through which the Customer obtains the means of payment.

The invention is based on partially blind signature schemes providing revocable anonymity.

In the context of the present invention a signature is an electronic signature. It has the same functions as a manuscript signature.

An electronic signature assures the receiver of a message of the identity of the signatory of the message and of the signatory's willingness to comply with the signed message.

A blind signature scheme is a public key cryptographic protocol enabling an entity to sign a message without knowing either the message or the signature delivered. What is more, for the scheme to function correctly, the signatory must be incapable afterwards of linking the message, the signature and the person to whom it supplied that signature (assuming that it has effected a certain number of signatures).

The difference between a blind signature scheme and a partially blind signature scheme is that when the signature is partially blind the signatory can see a portion of the message, the remainder being concealed from the signatory.

Finally, when the blind signature is of the revocable anonymity type, a third entity, often called the trustee, and a revocation protocol linking the signatory and the trustee enable the trustee to revoke the anonymity on the basis of information supplied by the signatory are necessary.

There are two types of revocation protocols, depending on the information that the trustee receives from the signatory:
  type 1 revocation: using information exchanged during the signature protocol between the signatory and the user and sent by the signatory, the trustee supplies information that enables the signatory to determine the message and the signature;
  type 2 revocation: using the message and the signature, the trustee enables the signatory to determine the user or the portion of the protocol corresponding to the signature.

It is possible to seek both types of anonymity revocation at the same time. In the following description, it is the second type of revocation that is used.

Figure 1:
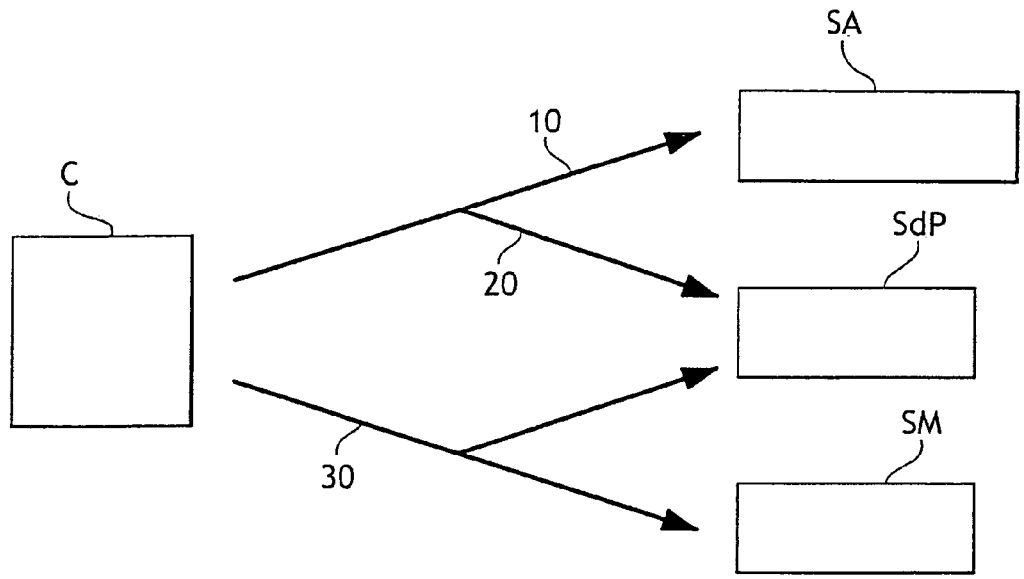
FIG. 1 is a diagram of the steps of the method of the present invention.

As shown in FIG. 1, the anonymous and secure on-line payment method involves four entities: a Customer C, a Merchant Site SM, an Anonymity Server SA and a Payment Server SdP.

The Customer C is an entity that wishes to access on-line services for which a payment must be made, and to pay anonymously, without having to give a bank card number.

The Merchant Site SM is an entity that offers the Customer C access to on-line services that must be paid for. The Merchant Site SM is a website, for example. The services may be of diverse kinds, such as: sending SMS messages, access to information that must be paid for (weather, etc.), payment for a right to access or to use images (author's rights, etc.), or other services that must be paid for such as those offered by games sites and contact sites.

The Anonymity Server SA is an entity that authenticates the Customer C, provides the Customer with the means of payment, and signs a virtual ticket.

A virtual ticket is a means of payment. This means of payment is anonymous, i.e. it comprises no personal information on the Customer C.

It is an electronic voucher comprising in particular an amount, an expiry date, and a signature. The amount indicated on the ticket corresponds to a sum paid by the Customer C to the Anonymity Server SA when the ticket was created. A ticket is therefore an anonymous means of payment corresponding to a debt.

The Anonymity Server SA may be any entity having means for verifying the identity of the Customer C.

The Anonymity Server SA may be the Internet Service Provider (ISP) of the Customer C, for example. In this case, the Customer C authenticates himself or herself to the ISP using the password of the user account, and the ticket is billed to the Customer's Internet access account, for example.

The Payment Server SdP is an entity that manages an anonymous account for the Customer C.

An anonymous account is one in which all transactions of the Customer C on Merchant Sites SM are listed but where the identity of the Customer C is not known.

The Payment Server SdP creates the anonymous account of the Customer C on presentation of a valid ticket and manages the debiting of the account during payment phases.

The anonymous and secure payment process is divided into a number of steps.

In a first step, the Customer purchases a virtual ticket on-line. This is step 10 in FIG. 1. In a second step, the Customer uses the ticket to open an anonymous account. This is step 20 in FIG. 1. In a third step, the Customer uses the anonymous account to make on-line purchases. This is step 30 in FIG. 1.

The step 10 of on-line purchase of the ticket involves the Customer C and the Anonymity Server SA. The Customer authenticates himself or herself to the Anonymity Server SA and chooses the amount to have available on the ticket. The Customer then obtains from the Anonymity Server SA a signed ticket.

The step 20 of opening the anonymous account involves the Customer C and the Payment Server SdP. The Customer C sends to the Payment Server SdP the ticket as signed by the Anonymity Server SA. The Payment Server SdP then opens an anonymous account for the Customer C and sends an account code to the Customer. That code enables the Customer C to pay for on-line purchases using the anonymous account.

The step 30 of using the account to effect on-line purchases involves the Customer C, the Payment Server SdP and a Merchant Site SM.

The Customer C wishes to make a payment on the Merchant Site SM using the anonymous account. The Customer selects that mode of payment and enters the code of the anonymous account. That anonymous account is then debited by the Payment Server SdP and the Customer C has access to the services that have been paid for.

Figure 2:
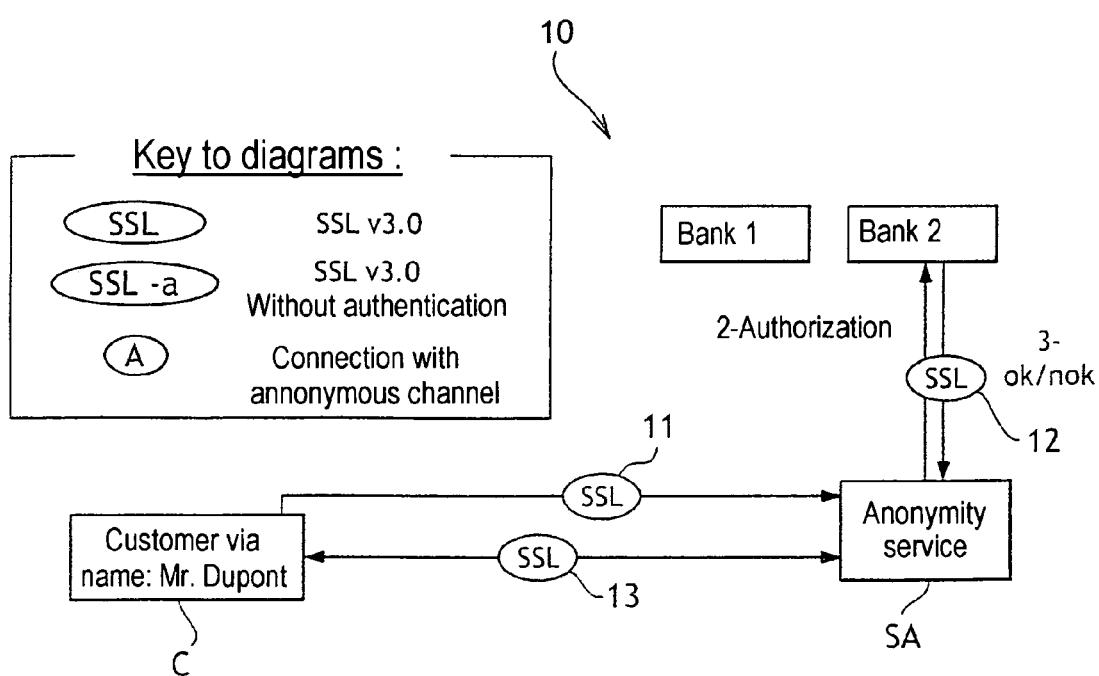
FIG. 2 is a more detailed diagram of the first step of the method of the present invention consisting in the purchase of a ticket.

FIG. 2 shows the first step 10 of the method in more detail. This step 10 consists for the Customer C in purchasing a ticket on-line from the Anonymity Server SA.

To purchase a ticket on-line, the Customer C authenticates himself or herself to the Anonymity Server SA and tells it the amount to be made available on the ticket. This is step 11 in FIG. 2. To authenticate himself or herself, the Customer sends his or her name, the organization that manages his or her account, and the account number, for example.

The Anonymity Server SA verifies that the Customer C is good for the amount specified via the on-line site of the organization that manages the Customer's personal account (for example the Customer's personal bank or the Internet Service Provider, or any other organization able to bill the Customer C). If the Customer C is good for the amount, the Customer's the personal account is debited. This is step 12 in FIG. 2.

To communicate, the Anonymity Server SA and the Customer C use known techniques for Customer-server communication (for example SSL v3.0) based on public key cryptographic algorithms.

A partially blind signature protocol with revocable anonymity is used by the Customer C and the Anonymity Server SA that so the Customer C obtains a signed ticket from the Anonymity Server SA without the Server knowing the signature (see the documents [CMS96, CMS97, dST98a, dST98b, FTY96, FTY98] for examples of blind signature schemes with revocable anonymity).

The ticket is therefore generated and then signed and then sent by the Anonymity Server to the Customer C. This is step 13 in FIG. 2.

The signature obtained serves as a serial number for the ticket. Because the partially blind signature protocol uses random factors at both Customer and server levels, two tickets having the same properties produce two different signatures. Moreover, only the Customer C knows the signature, since it is calculated by the Customer at the end of the partially blind signature protocol based on the data received by the Anonymity Server SA.

The Anonymity Server SA therefore sends the Customer C the signed ticket that has been generated without knowing the signature or serial number of the ticket (and therefore without being able to link the ticket to the Customer).

Figure 3:
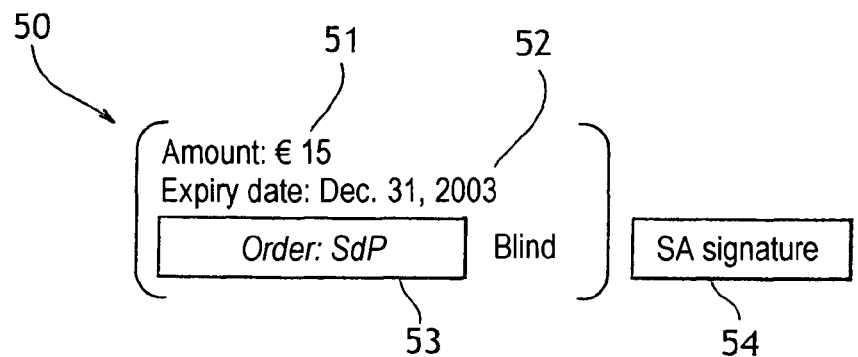
FIG. 3 is a representation of a ticket used in the method of the present invention.

As shown in FIG. 3, the ticket 50 comprises an amount 51, a validity date 52, an order 53, and a signature 54.

The amount 51 corresponds to the sum of money that the Customer C communicated to the Anonymity Server SA during the step 10 of purchasing the ticket.

The expiry date 52 corresponds to the period for which the ticket 50 is valid.

The order 53 corresponds to information on the identity of the Payment Server SdP on which the Customer C wishes to open an anonymous account.

The signature 54 is the encrypted imprint generated by the Anonymity Server SA. It is a cypher corresponding to the serial number of the ticket. The Anonymity Server SA does not know this signature.

Thus the ticket 50 carries no personal information on the Customer C. Moreover, the fact that the Anonymity Server does not know the signature (or serial number) of the ticket prevents it from being able to link a ticket to its proprietor. The Customer C is anonymous when using the ticket 50 to open an account with the Payment Server SdP.

Figure 4:
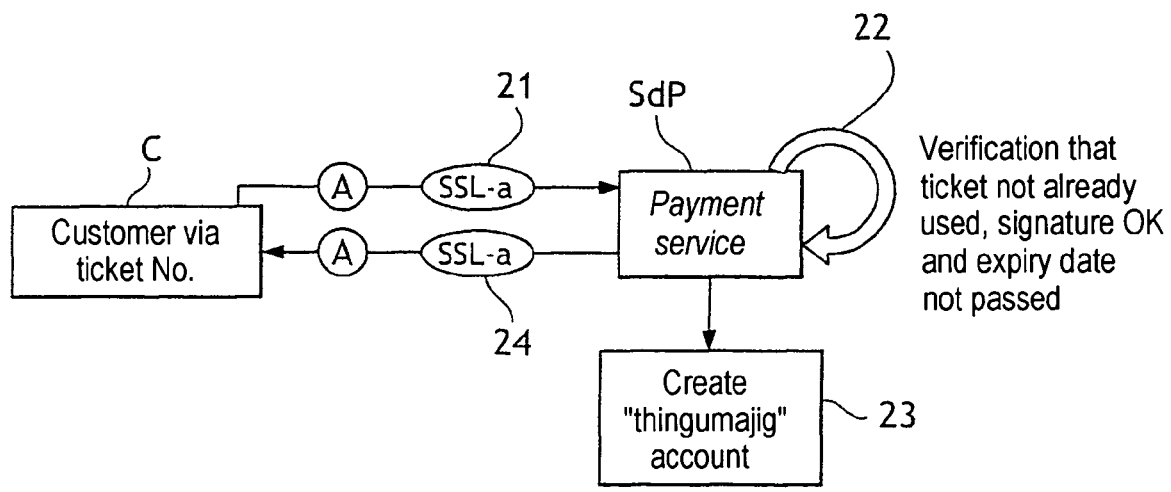
FIG. 4 is a more detailed diagram of the second step of the method of the present invention consisting in opening an anonymous account.

FIG. 4 shows in more detail the second step 20 of the method. For the Customer C, this step 20 consists in using the ticket 50 to open an anonymous account with the Payment Server SdP.

The Customer C sends the payment Server SdP, possibly during a different session, the virtual ticket 50, consisting of an amount 51, a validity date 52, an order 53, and the signature 54 of the Anonymity Server SA. This is step 21 in FIG. 4.

The Payment Server SdP verifies that the ticket 50 has not been used already, using a list of used tickets, that the signature 54 is valid and does indeed emanate from the Anonymity Server SA, using the public key of the Anonymity Server SA, and that the expiry date 52 of the ticket 50 has not passed. This is step 22 in FIG. 4.

If everything is in order, it opens an anonymous account for the ticket 50. This is step 23 in FIG. 4.

It then sends the Customer C a code that enables the Customer to pay using the anonymous account. This is step 24 in FIG. 4.

To communicate, the Payment Server SdP and the Customer C also use secure Customer-server communication techniques (for example SSL v3.0). To prevent the Customer C being recognized from the IP address of the Customer, an anonymous channel is used when opening the anonymous account.

Once the account of the Customer with the Payment Server SdP has been opened, the Customer C can make on-line purchases from a mobile telecommunications terminal. To pay for purchases anonymously, the Customer C needs only the code used to pay using the anonymous account.

Figure 5:
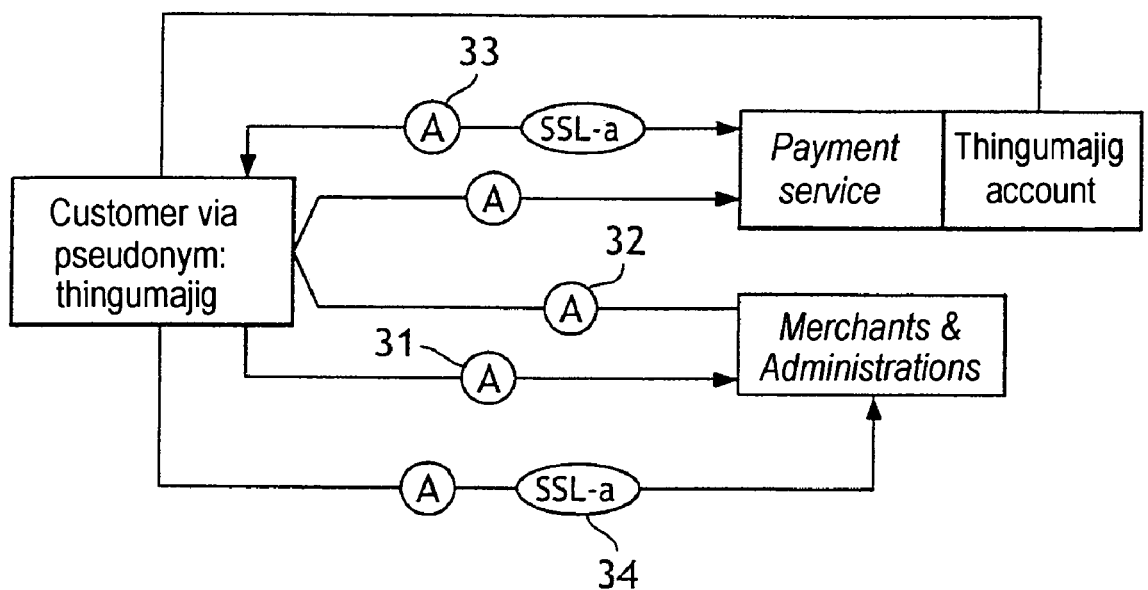
FIG. 5 is a more detailed diagram of the third step of the method of the present invention consisting in using the anonymous account to effect purchases on-line.

FIG. 5 shows in more detail the third step 30 of the method. For the Customer C, this step 30 consists in using the anonymous account to make on-line purchases on a Merchant Site SM.

When the Customer C needs to make a payment on a Merchant Site SM, and wishes to remain anonymous, the Customer opts to pay using the anonymous account. This is step 31 in FIG. 5.

The Merchant Site then redirects the Customer C to the Payment Server SdP. This is step 32 in FIG. 5.

The Customer authenticates himself or herself to the Payment Server SdP anonymously, using the code, and the server debits the Customer's anonymous account. This is step 33 in FIG. 5.

The Payment Server SdP then refers the Customer C to the chargeable pages of the Merchant Site SM or sends the Merchant Site its approval of the payment. This is step 34 in FIG. 5.

Under such circumstances, secure Customer-server communication techniques (for example SSL v3.0) and an anonymous channel are used for communication between the Payment Server SdP, the Merchant Site SM and the Customer C, in order to prevent the Customer C from being recognized from the IP address the Customer is using.

In the system described above, anonymity can be revoked thanks to the blind signature mechanisms used. Revoking anonymity enables the Customer to whom a ticket number belongs to be identified, and even the tickets obtained by a given Customer to be traced, where appropriate. For this, it is necessary to add a new protagonist, an entity known as the trustee, and a revocation protocol between the trustee and the signatory enabling the trustee to revoke the anonymity on the basis of information supplied by the signatory.

The reader will understand that many variants of the present method are feasible and that the scope of protection is not limited to the elements described above but also covers any improvements thereto.

In the partially blind signature protocol, the portion of the ticket in clear must consist of the amount that the Customer C wishes to appear on said ticket. The concealed portion (encrypted portion) of the ticket may contain the Payment Server SdP on which the Customer C wishes to open an account.

The portion of the ticket in clear may also contain information supplied by the Anonymity Server (for example age, sex, etc.) used by the Payment Server to offer services such as parental control or to provide statistics on the number of hits on Merchant Sites.

REFERENCES

[CMS96] J. Camenisch, U. Maurer, M. Stadler, Digital payment systems with passive anonymity-revoking trustees, Proceedings of ESORICS '96, volume 1146 of LNCS, pages 33-43, Springer-Verlag, 1996.
[CMS97] J. Camenisch, U. Maurer, M. Stadler, Digital payment systems with passive anonymity-revoking trustees, Journal of Computer Security, vol. 5, IOS Press, 1997.
[C82] D. Chaum, Blind Signatures for Untraceable Payments, Crypto '82, Plenum Publishing, pp. 199-203.
[dST98a] A. de Solages, J. Traoré, An efficient fair off-line electronic cash system with extensions to check and wallet with observers, Proceedings of Financial Crypto '98, volume 1465 of LNCS, pages 275-295, Springer-Verlag, 1998.
[dST98b] A. de Solages, J. Traoré, Procédé de signature numérique juste [Fair digital signature method], no. 98 02197, CENT/02959, 24/02/98.
[FTY96] Y. Frankel, Y. Tsiounis, M. Yung, Indirect discourse proofs: achieving fair off-line electronic cash, Proceedings of Asiacrypt '96, volume 1136 of LNCS, pages 244-251, Springer-Verlag, 1996.
[FTY98] Y. Frankel, Y. Tsiounis, M. Yung, "Fair off-line cash made easy", Proceedings of Asiacrypt '98, volume 1514 of LNCS, Springer-Verlag, 1998.
[ECBa] http://www.e-cartebleue.com
[ECBb] http://www.imago-conseil.com/Avis/X2001/103carteb.htm
[P.K03] J. M. Peha, I. Khamitov, Pay Cash: a Secure Efficient Internet Payment System, International Conference on Electronic Commerce, October 2003.
[TSa] http://www.ticket-surf.com
[TSb] http://www.abc-netmarketing.com/article.php3?id article=1923

The invention claimed is:

1. A method for permitting a Customer (C) to perform anonymous and secure on-line payments via a fixed or mobile telecommunications terminal, comprising the steps of:
    offering to the Customer (C), from an Anonymity Server (SA), online acquisition of anonymous payment means for an on-line payment via the fixed or mobile telecommunications terminal, said on-line acquisition being based on a protocol that does not enable the Anonymity Server (SA) to link the anonymous payment means to the Customer (C);
    opening, at a Payment Server (SdP), an anonymous account for the Customer (C) from the fixed or mobile telecommunications using the acquired anonymous payment means; and
    operating the Payment Server (SdP) for use of the opened anonymous account by the Customer (C) to effect on-line purchases on Merchant Sites (SM) using the opened anonymous account and to manage the anonymous account.

2. The method according to claim 1, further comprising the step of:
    revoking, at a trusted entity, the anonymity of the Customer (C) during instances of fraud based on information supplied by the Anonymity Server (SA).

3. The method according to claim 1, wherein the step of offering the Customer (C) the on-line acquisition of the anonymous payment means comprises the steps of:
    authenticating, at the Anonymity Server (SA), the Customer (C) based on personal data sent by the Customer;
    debiting, at the Anonymity Server (SA), a personal account of the Customer (C) for an amount corresponding to an amount required by the Customer for the anonymous payment means;
    generating, at the Anonymity Server (SA), the anonymous payment means, said generating comprising the amount required by the Customer (C) and a signature of the Anonymity Server (SA); and
    sending, from the Anonymity Server (SA), the generated anonymous payment means to the Customer (C).

4. The method according to claim 1, wherein the step of opening, at a Payment Server (SdP), the anonymous account by the Customer (C) using the acquired anonymous payment means comprises the steps of:
    receiving, at the Payment Server (SdP), the anonymous payment means and verifying validity of the anonymous payment means;
    creating, at the Payment Server (SdP), the anonymous account for the Customer (C) based on information supplied by the anonymous payment means, said account being credited with an amounted required by the Customer (C) for the anonymous payment means; and
    sending, from the Payment Server (SdP), a code to the Customer (C) for enabling the Customer to use the created anonymous account to effect an on-line purchase on the Merchant Sites (SM).

5. The method according to claim 1, wherein the step of operating the Payment Server (SdP) for use of the opened account by the Customer (C) to effect on-line purchases on the Merchant Sites (SM) and to manage the account comprises the steps of:
    authenticating, at the Payment Server (SdP), the Customer (C) anonymously using the code supplied by the Payment Server (SdP) on opening the anonymous account;
    debiting, at the Payment Server (SdP), the anonymous account of the Customer (C); and
    redirecting the Customer (C) to chargeable pages of the Merchant Site (SM) or sending the Merchant Site (SM) an approval for the anonymous payment.

6. An Anonymity Server (SA) comprising means for offering a Customer (C) on-line acquisition of an anonymous payment means, the Anonymity Server (SA) being configured such that said on-line acquisition is based on a protocol that does not enable the Anonymity Server (SA) to link the anonymous payment means to the Customer (C), said anonymous payment means including data necessary for permitting a Payment Sewer (SdP) to open an anonymous account using the anonymous payment means and to manage the opened anonymous account which enables anonymous on-line purchases on Merchant Sites (SM).

7. The Anonymity Server (SA) according to claim 6, wherein the Anonymity Server is configured so that the acquisition of the anonymous payment means is based on a partially blind signature protocol that does not enable the Anonymity Server (SA) to link the anonymous payment means to the Customer (C).

8. The Anonymity Server (SA) according to claim 6, further comprising:
    means for authenticating the Customer (C) based on personal data sent by the Customer;

means for debiting a personal account of the Customer (C) by an amount of money corresponding to an amount required by the Customer for the anonymous payment means;

means for generating the anonymous payment means, said anonymous payment means comprising an amount required by the Customer (C) and a signature of the Anonymity Sewer (SA); and means for sending the generated anonymous payment means to the Customer (C).

9. A Payment Server (SdP) comprising means for opening an anonymous on-line account using anonymous payment means acquired on-line by a Customer (C) from an Anonymity Server (SA), said acquisition being based on a protocol that does not enable the Anonymity Server (SA) to link the anonymous payment means to the Customer (C), and for managing said anonymous account which is used to effect anonymous on-line purchases on Merchant Sites (SM).

10. The Payment Server (SdP) according to claim 9, further comprising:

means for receiving said anonymous payment means and for verifying validity of the anonymous payment means;

means for creating the anonymous on-line account for the Customer (C) based on information supplied by the anonymous payment means, said anonymous on-line account being credited with an amount indicated by the anonymous payment means; and means for sending a code to the Customer (C) enabling the Customer to use the created anonymous account to effect anonymous on-line purchases on Merchant Sites (SM).

11. The Payment Server (SdP) according to claim 9, further comprising:

means for authenticating anonymously the Customer (C) utilizing the anonymous on-line account to effect an online purchase;

means for debiting the anonymous on-line account of the Customer (C); and means for one of redirecting the Customer (C) to chargeable pages of a Merchant Site (SM) and sending the Merchant Site (SM) payment approval.

12. An anonymous and secure on-line payment system usable by a Customer (C) from a fixed or mobile telecommunication terminal, the system comprising:

an Anonymity Server (SA) entity offering the Customer (C) on-line acquisition of anonymous payment means, said acquisition being based on a protocol that does not enable the Anonymity Server (SA) to link the anonymous payment means to the Customer (C); and a Payment Server (SdP) entity configured to open an anonymous account using the anonymous payment means and configured to manage the opened anonymous account, said anonymous account enabling anonymous on-line purchases on Merchant Sites (SM).

13. The system according to claim 12, further comprising:

a trusted entity which comprises a trustee; and a revocation protocol which enables the trustee to revoke the anonymity of the Customer (C) during instances of fraud based on information supplied by the Anonymity Server (SA).

14. An anonymous and secure on-line payment system usable by a Customer (C) from a fixed or mobile telecommunication terminal, the system comprising:

an Anonymity Server (SA) entity offering the Customer (C) on-line acquisition of anonymous payment means, said acquisition being based on a protocol that does not enable the Anonymity Server (SA) to link the anonymous payment means to the Customer (C); and a Payment Server (SdP) entity configured to open an anonymous account using the anonymous payment means and to manage the opened anonymous account, said anonymous account enabling anonymous on-line purchases on Merchant Sites (SM);

wherein the system implements the method of claim 1.

* * * * *